Figure 1:
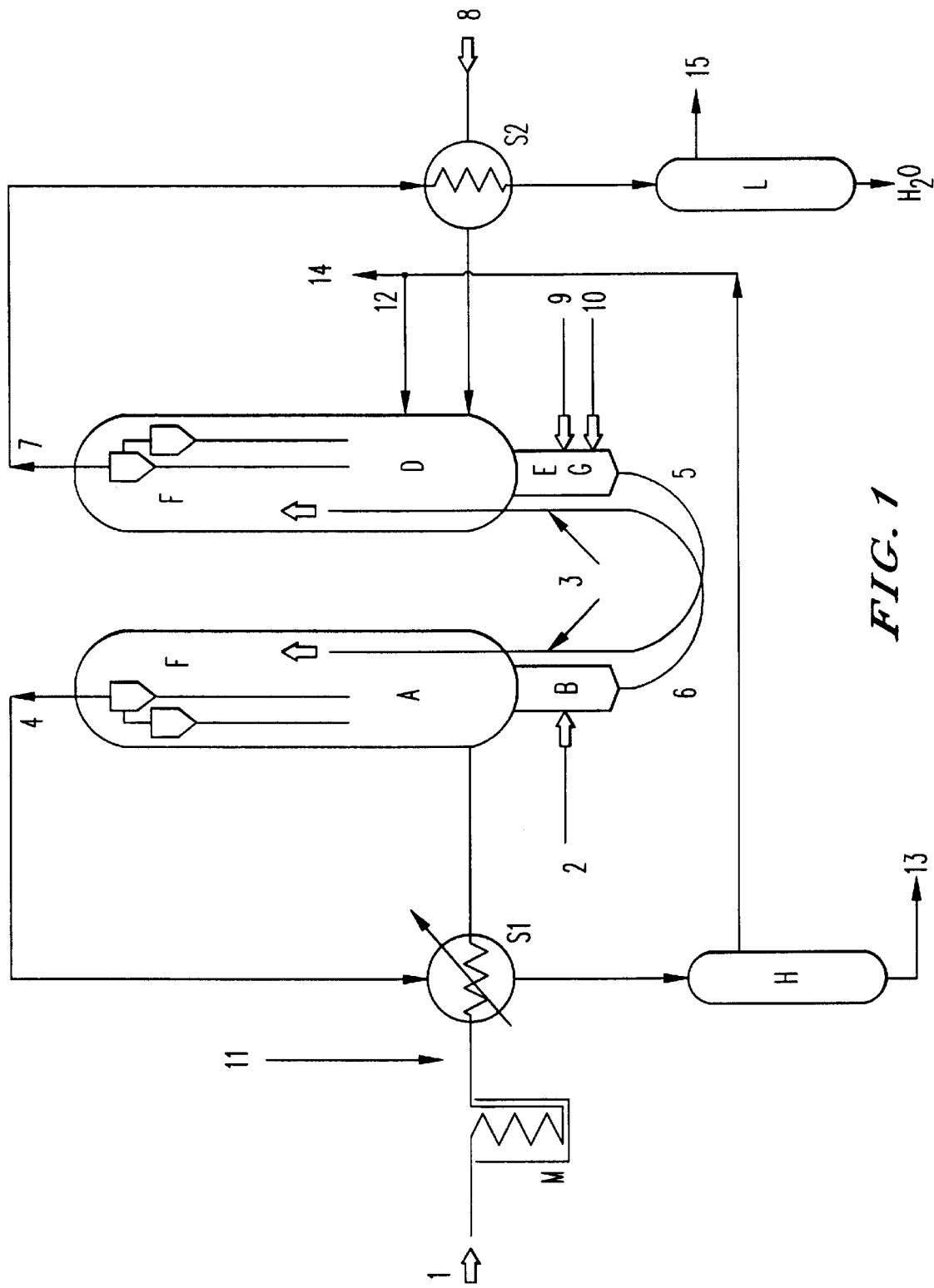

United States Patent [19]

Locatelli et al.

[11] Patent Number: 6,080,821
[45] Date of Patent: Jun. 27, 2000

[54] CONTINUOUS PROCESS FOR THE SELECTIVE CROSS-LINKING OF THE DISPERSED PHASE OF AES POLYMERS USING MIXING EQUIPMENT AT THE END OF THE PLANT

[75] Inventors: Lino Locatelli, Vigevano; Maria Antonella Pastorino, Genoa, both of Italy

[73] Assignee: Enichem S.p.A., Milan, Italy

[21] Appl. No.: 08/941,039

[22] Filed: Sep. 30, 1997

[30] Foreign Application Priority Data

Oct. 8, 1996 [IT] Italy .................................. MI96A2074

[51] Int. Cl.⁷ .................................................. C08F 255/06
[52] U.S. Cl. .......................... 525/304; 525/244; 525/308; 525/329.3
[58] Field of Search ..................................... 525/304, 308, 525/329.3, 244

[56] References Cited

U.S. PATENT DOCUMENTS 5,166,260  11/1992  Buonerba ................................. 525/52
5,310,792  5/1994  Inoue ....................................... 525/64

*Primary Examiner*—Fred Zitomer
*Attorney, Agent, or Firm*—Oblon, Spivak, McClelland, Maier & Neustadt, P.C.

[57] ABSTRACT

The present invention relates to a continuous process for the selective cross-linking of the dispersed phase of polymers based on acrylonitrile/ethylene-propylene-diene monomer (EPDM) rubber/styrene (AES), which comprises: a) addition to the polymer, which leaves the end of the synthesis plant still in the molten state, of cross-linking substances and coreagents; b) passing the compound through suitable mixing equipment.

10 Claims, 7 Drawing Sheets

CONTINUOUS PROCESS FOR THE SELECTIVE CROSS-LINKING OF THE DISPERSED PHASE OF AES POLYMERS USING MIXING EQUIPMENT AT THE END OF THE PLANT

The present invention relates to a continuous process for the selective cross-linking of the dispersed phase of polymers based on acrylonitrile/ethylene-propylene-diene monomer (EPDM) rubber/styrene (AES), which comprises:
a) addition to the polymer, which leaves the end of the synthesis plant still in the molten state, of cross-linking substances and coreagents;
b) passing the compound through suitable mixing equipment.

It is commonly known that to improve the impact strength of thermoplastic materials based on styrene, it is necessary to disperse suitable rubbers in the matrix; this can take place either by the mechanical mixing of the rubber in the styrene compound already formed or by introducing the rubber directly during the polymerization phase of the monomers used.

In both cases, the rubber phase is dispersed in styrene and, if it is introduced during the polymerization of the monomeric components, as described for example in U.S. Pat. No. 5,166,260, it undergoes grafting on the part of the monomers themselves, thus increasing its compatibility with the rigid phase; this allows the production of polystyrenes or styrene copolymers with a high molecular weight.

In addition, to improve the thermal resistance, rigidity, resilience and processability with transformation machines of the material obtained, it is necessary for the elastomeric phase thus introduced to be cross-linked in order to give the product a high morphological stability.

This is carried out in transformation machines, such as extruders or mixers, in which selective cross-linking agents are added to the product leaving the production plant, such as organic peroxides, azocompounds or, in other cases, mixtures based on maleimides (bismaleimide) or substituted maleimides, α-β substituted unsaturated carboxylic acids also in the presence of a co-reagent of the dihydro-quinoline type, as described in U.S. Pat. No. 5,310,792, column 6, lines 49–65.

The disadvantages of this method relate to the high energy consumption associated with the use of the extruder; in addition the process is carried out in various steps owing to the necessity of cooling and granulating the polymer which leaves the plant in its molten state before adding it to the cross-linking agent.

To avoid these inconveniences, the Applicant has developed a cross-linking process which overcomes the necessity of carrying out the cross-linking reaction of the elastomeric phase in transformation machines and with various steps, by operating directly at the end of the plant where the synthesized polymer leaves still in the molten state.

The present invention therefore relates to a continuous process for the selective cross-linking of the dispersed phase of polymers based on acrylonitrile/ethylene-propylene-diene monomer (EPDM) rubber/styrene (AES), which comprises:
a) addition to the polymer, which leaves the end of the synthesis plant still in the molten state, of cross-linking substances and coreagents;
b) passing the compound through suitable mixing equipment.

The mixing equipment can consist of static or dynamic mixers but the use of static mixers is preferred.

The additives used for this purpose are cross-linking substances selected from polyfunctional monomers containing at least two unsaturations and coreagents selected from dihydro-aromatic compounds.

The polyfunctional monomers used must be capable of forming charge-transfer complexes with the dihydro-aromatic compounds; the diesters of methacrylic acids, bismaleimide compounds and diallyl compounds can be used.

Among these, ethylene-glycol dimethacrylate, diethylene-glycol dimethacrylate, propylene-glycol dimethacrylate, hydroquinone dimethacrylate, methylhydroquinone dimethacrylate, N,N'-m-phenylenebismaleimide, 4,4'-bismaleimidodiphenyl methane, diallylphthalate, diallylterephthalate, can be advantageously used; the most reactive, and therefore the most preferred, among these are N,N'-m-phenylenebismaleimide and hydroquinone dimethacrylate.

Dihydro-aromatic compounds contain one or more aromatic rings, one of which is dihydrogenated; examples of these compounds which can be used for our purposes are 1,2-dihydronaphthalene, 9,10-dihydrophenanthrene, 6-decyl-2,2,4-trimethyl-1,2-dihydroquinoline, 6-ethoxy-2,2,4-trimethyl-1,2-dihyroquinoline and 2,2,4-trimethyl-1,2-dihydroquinoline.

Alternatively, polymeric forms of these compounds can also be used and, preferably, poly(6-ethoxy-2,2,4-trimethyl-1,2-dihydroquinoline) (ETMQ) and poly(2,2,4-trimethyl-1,2-dihydroquinoline) (PTMQ).

Figure 2:
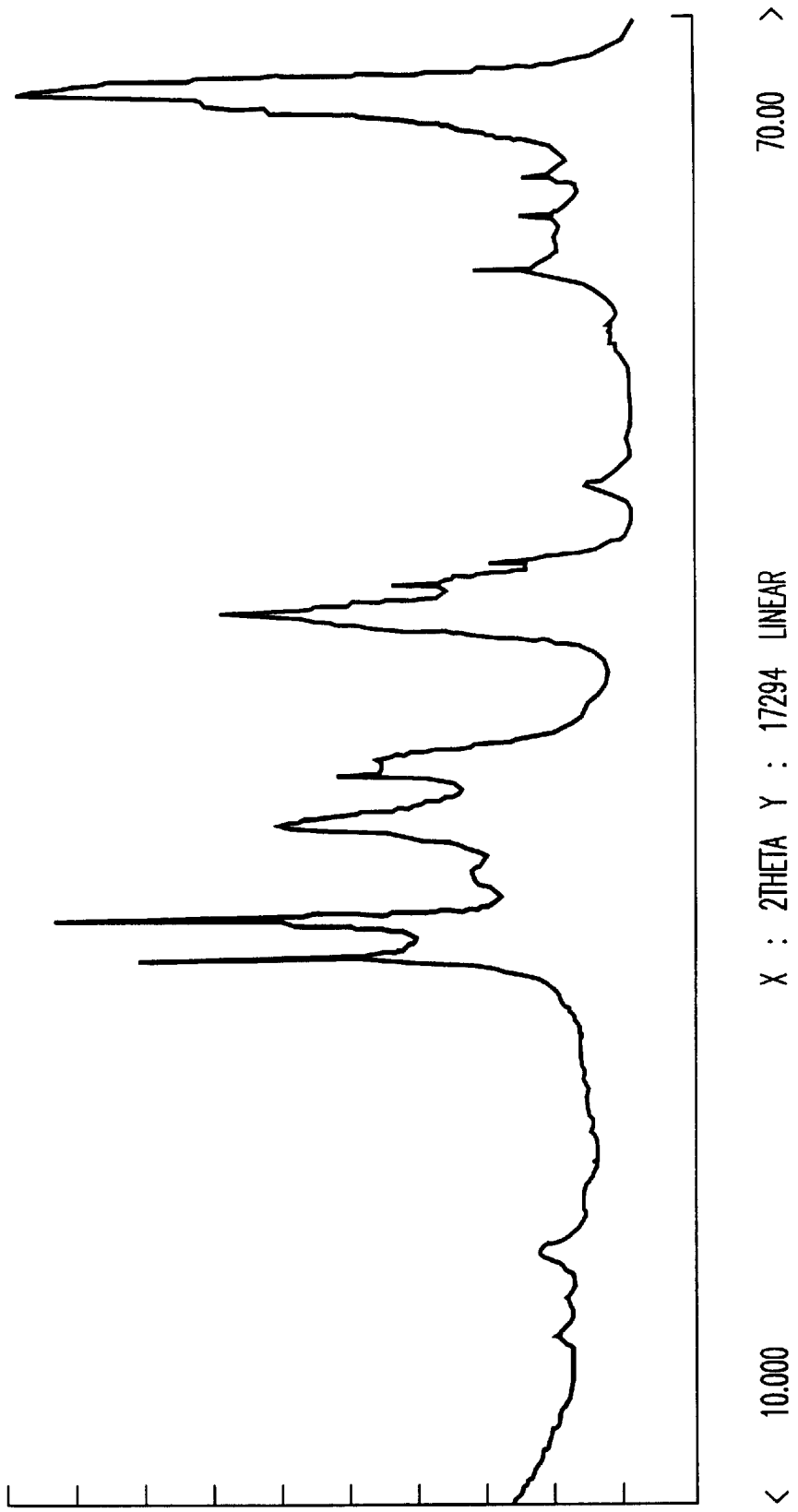
Figure 3:
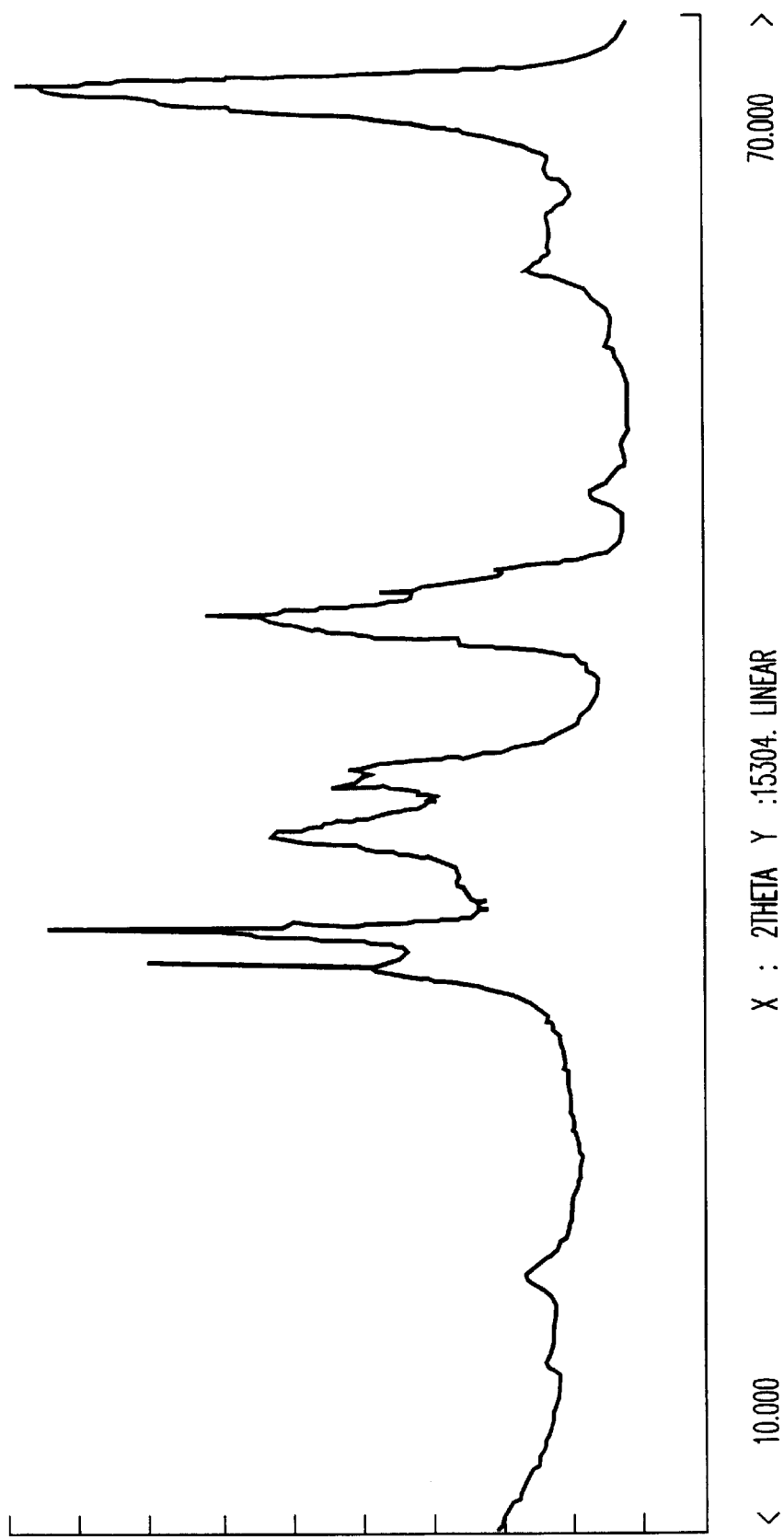

The polymerization reaction takes place in the plant of which a scheme is provided in the FIGS. 1, 2 and 3, which is the object of the U.S. Pat. No. 5,166,260, which is therefore an integrant part of the present invention.

The polymer leaves the bottom of the tubular reactor (r) in its molten state and can follow, depending on the various configurations with which the mixers have been arranged, three different possibilities:
A) High Pressure Plant Scheme (FIG. 1):
the polymer, leaving the reactor (r) at a temperature varying from 180 to 250° C. is removed by a high pressure gear pump (f), and precisely up to 70 MPa, which sends it to several static mixers situated in series; the average residence time, varying inside the mixers themselves, is between 3 and 20 minutes.

This average residence time and residence time distribution (RTD) are specific characteristics of each mixing unit and can consequently widely vary depending on the number and type of mixing units assembled in series.

This is another advantage with respect to the batch process which uses known extruders.

In fact, the longer the average residence time of the polymer/additive mixture inside the mixer, the greater will be the degree of possible cross-linking for providing a better reaction yield of selective cross-linking; a smaller quantity of additives will therefore be required, which, being better distributed, will in any case improve the impact strength (IZOD) even after several successive extrusions used for the final granulation of the product before storage.

The reagents used for the selective cross-linking are charged into the tanks (a) and, either pre-mixed in a first mixer (b) or separately, are introduced by means of a high pressure injection system (d) into suitable static mixing zones (e) situated in series.

In both cases, injection pumps (c) must be used, whose pressure must be 10% higher than that of the feeding pump of the molten polymer (f), and preferably between 9 and 28 MPa.

The single components can be injected either in solution using polar solvents such as alcohols or ketones (ethyl alcohol, propyl alcohol, acetone, methyl-ethyl ketone, etc.) or in the form of paste by mixing them with small quantities of liquids which allow them to flow, such as water, alcohols or ketones, or also in the "molten state", if allowed by the stability of the reagents.

B) Low Pressure Plant Scheme (FIG. 2):
the polymer, leaving the reactor (r) at a temperature varying from 180 to 250° C., is removed by a high pressure gear pump (f), and precisely up to 70 MPa, which sends it to several static mixers situated in series; the average residence time, varying inside the mixers themselves, is between 3 and 20 minutes.

The procedure for the selection of the average residence time is completely analogous to that described above.

The introduction into the mixers (e) of the reagents used for the selective cross-linking however is different: in this case the feeding takes place within the polymer mass, in a zone situated upstream of the suction of the pump (f) where the pressure of the polymer in the molten state varies from 0.02 to 0.15 MPa.

The injection system (c) also operates at low pressure which does not exceed 2.5 MPa and is preferably between 0.15 and 0.5 MPa.

The single components are injected according to the procedure described for the plant scheme of FIG. 1.

C) Low Pressure Plant Scheme With Static Mixer (e') on the Suction of the Pump of the Molten Polymer (f)
(FIG. 3): the polymer, leaving the reactor (r) at a temperature varying from 180 to 250° C., is added to the reagents for the selective cross-linking in a static suction mixer (e') within the polymer mass in a zone situated upstream of the suction of the pump (f) where the pressure of the polymer in its molten state varies from 0.02 to 0.15 MPa, and is sent, before the suction of the pump (f), to the static mixers (e).

The reactive compounds are thus homogenized with the polymer before the compression action of the pump itself; this allows the average residence time to be further lengthened which, in the presence of the static delivery mixer is between 10 and 35 minutes instead of between 5 and 10 minutes as in the previous cases.

The injection system (c) operates at the same pressures as that of the plant scheme of FIG. 2 and the single components are injected according to the procedure described for the plant scheme of FIG. 1.

The concentrations of the quinoline cross-linking agents can vary from 0.5 to 50% by weight referring to the percentage of elastomeric phase present and preferably between 1 and 25% by weight, whereas those of the compounds of the maleimide type can vary from 0.5 to 50% by weight referring to the percentage of elastomeric phase present and preferably between 1 and 30%.

The following experimental examples are provided for illustrative purposes and do not limit the scope of the present invention.

EXAMPLE 1

According to the plant scheme of FIG. 1, the AES polymer at the end of the plant containing, as elastomeric phase EPDM (original unsaturation of up to 9% by weight of 5-ethylidene-2-norbornene) and as rigid matrix SAN (styrene-acrylonitrile copolymer), leaves the reactor (r) still in its molten state and is sucked by the pump (f) which sends it towards several static mixers in series.

The molten product contains about 25% of total elastomeric phase whereas the remaining part consists of SAN.

The flow-rate of the polymer sucked by the pump (f), maintained at a temperature of 240° C., is 1.6 l/h, equivalent to a mass flow-rate of about 1.4 kg/h, and there is a fraction of volatile components equal to 0.08% of the total.

The pressure at the inlet of the pump proves to be about 0.1 MPa, whereas the pressure at the outlet is maintained at 20–21 MPa which is the same as that at the inlet of the static mixers.

The reagents used for the selective cross-linking, preadded in the mixer (b) and consisting of N,N'-m-phenylenedimaleimide (0.45% parts by weight) and poly(2,2,4-trimethyl-1,2-dihydroquinoline) (PTMQ) (0.30% parts by weight), are sent by means of a high pressure pump to an injector (d) which operates at a pressure of 24 MPa in the inlet zone of the static mixers (e).

The average residence time in the mixing section is about 7 minutes.

The selective cross-linking takes place in this phase of the elastomeric portion of the AES polymer which, at the end of the static mixers, is cooled and granulated.

The properties of the selectively cross-linked polymer A compared with those of polymer B removed from the reactor (r) as such, are summarized in table 1.

Table 2 on the other hand compares the mechanical and rheological properties of polymers A and B after successive extrusions.

The tests were carried out with the injection moulding technique.

TABLE 1

| Characteristics | ASTM | Meas. units | Pol. A | Pol. B |
|---|---|---|---|---|
| Tensile Modulus (E) | D638[1] | MPa | 1940 | 1770 |
| $\sigma_U$ | | MPa | 39.4 | 34.8 |
| $\epsilon_U$ | | % | 3.3 | 3.5 |
| $\sigma_B$ | | MPa | 32.2 | 29.5 |
| $\epsilon_B$ | | % | 119 | 76 |
| IZOD c.i | D256[2] | J/m | 1220 ± 41 | 1170 ± 60 |
| MFI (220° C./98, 1N) | D1238 | g/10' | 9.5 | 9.9 |

[1]test sample M3
[2]test sample ½" × ⅛" – 7.5 J club.

TABLE 2

| | | | 1st extr.[3] Pol. A Pol. B | 2nd extr.[3] Pol. A Pol. B |
|---|---|---|---|---|
| Character. | ASTM | Meas. units | | |
| IZOD c.i | D256[2] | J/m | 1136 ± 80 927 ± 69 | 1000 ± 44 805 ± 100 |
| MFI (220° C//98, 1N) | D1238 | g/10' | 10.5 12.2 | 10.8 13.3 |

[2]test sample ½" × ⅛" – 7.5 J club
[3]co-rotating twin-screw extruder Berstorff ZE 25 × 33 Dia.

The tables show that polymer A with respect to polymer B has an increased stability to processing in an extruder and a high resilience.

Figure 4A:
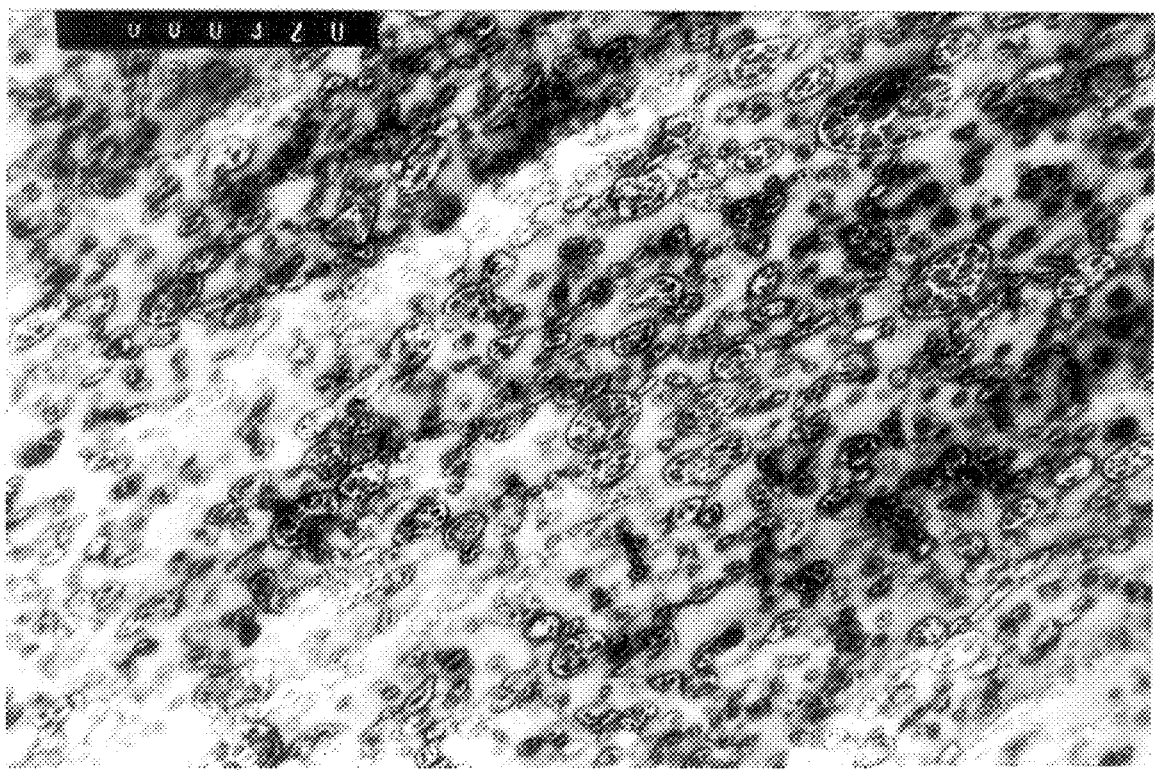
Figure 4B:
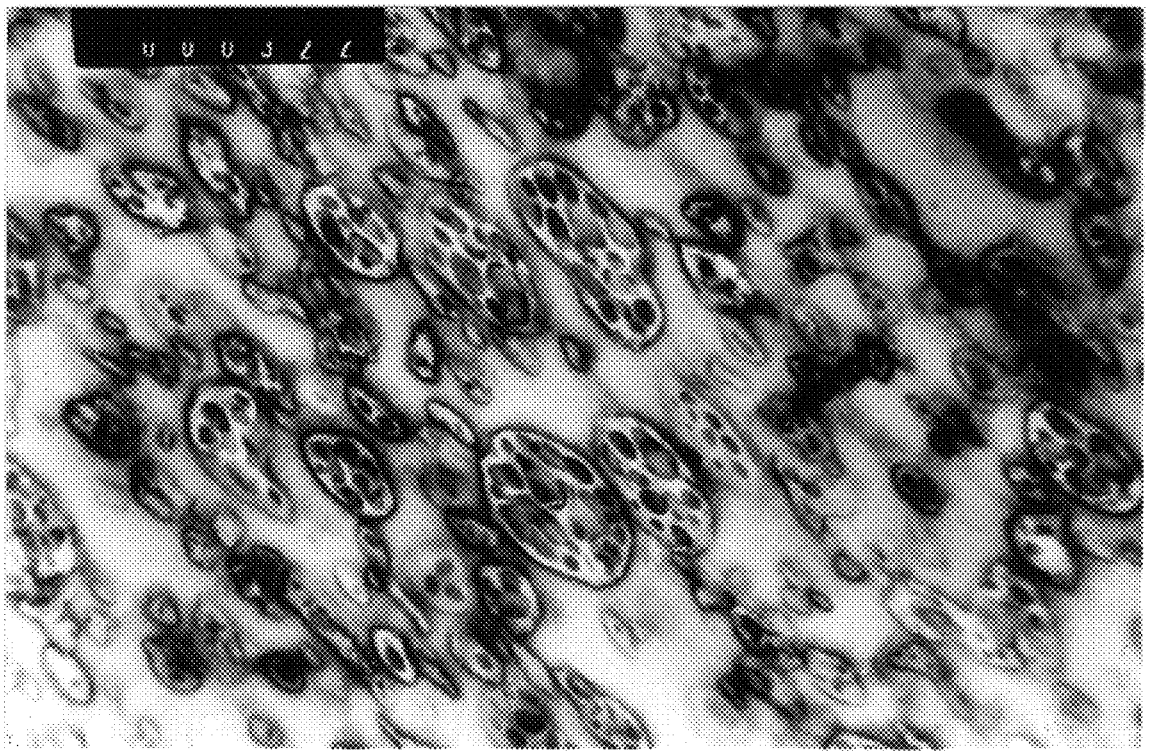
Figure 5A:
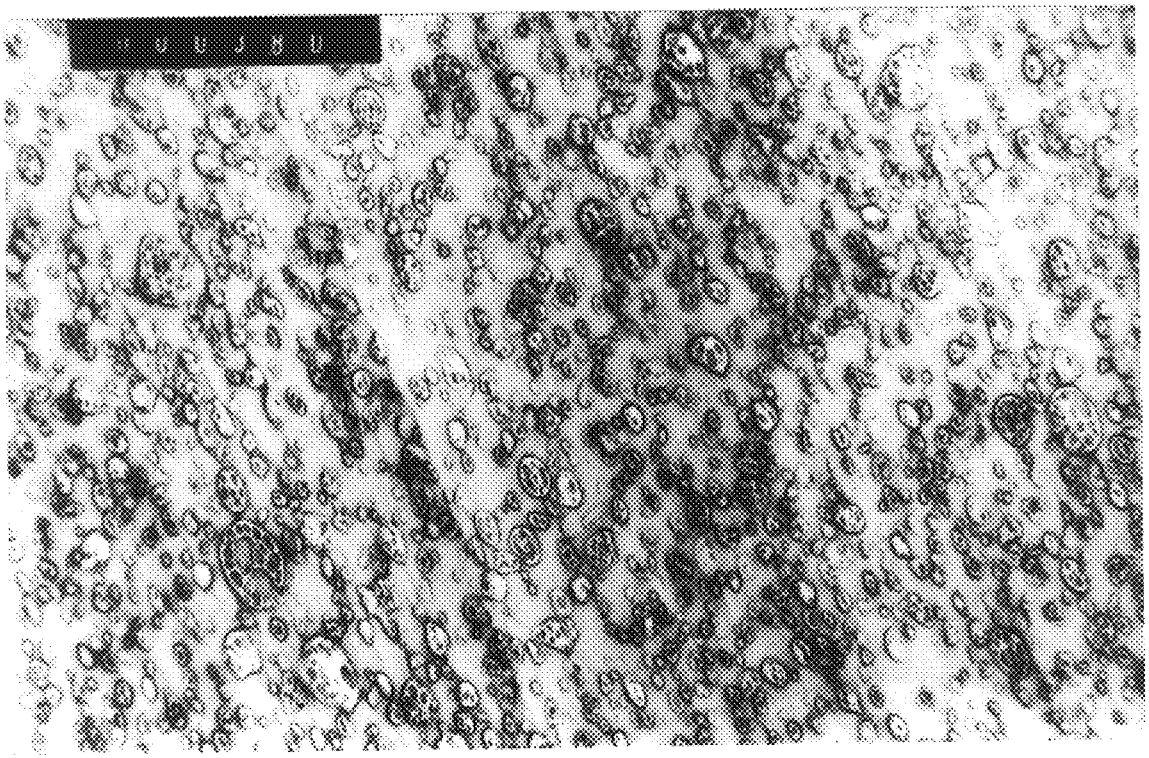
Figure 5B:
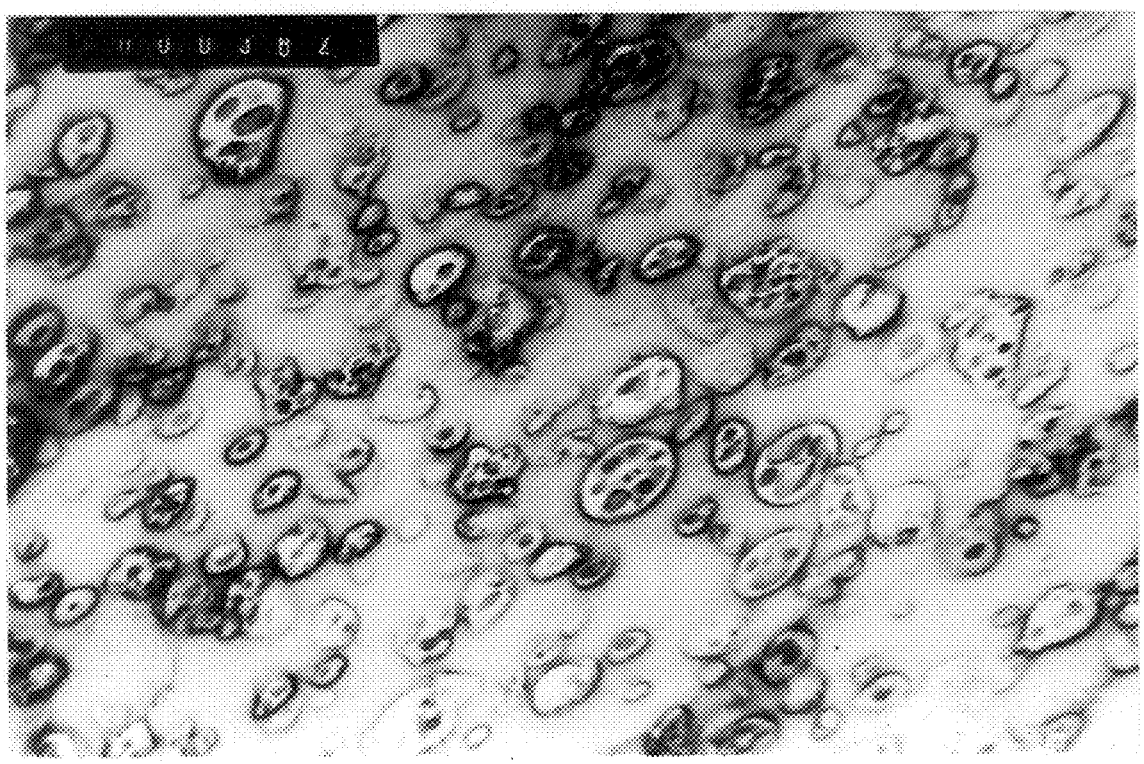

In addition, in FIGS. 4 and 5, which refer respectively to polymer A magnified by 18500× (FIG. 4a) and by 46080× (FIG. 4b) and to polymer B magnified by 18500× (FIG. 5a) and by 46080× (FIG. 5b), it can be clearly seen that polymer A owes its morphological stability, even after successive processing, to the cross-linking whereas polymer B, which is not cross-linked, has a much worse morphology.

EXAMPLE 2

The AES polymer at the end of the plant with a composition analogous to that of example 1, leaves the reactor (r), according to the plant scheme of FIG. 2, passing from the one-way valve (d') still in its molten state and is sucked by the pump (f) which sends it to several static mixers (e) situated in series.

The flow-rate of the polymer sucked by the pump (f), maintained at a temperature of 240° C., is 1.6 l/h, equivalent to a mass flow-rate of about 1.4 kg/h, and there is a fraction of volatile components equal to 0.08% of the total.

The pressure at the inlet of the pump proves to be about 0.1 MPa, whereas the pressure at the outlet is maintained at 20–21 MPa which is the same as that at the inlet of the static mixers.

The reagents used for the selective cross-linking, preadded in the mixer (b) and consisting of N,N'-m-phenylenedimaleimide (0.45% parts by weight) and PTMQ (0.30% parts by weight), are sent by means of a low pressure pump to an injector (d) which operates at a pressure of 0.25 MPa in a zone situated upstream of the suction of the pump where the pressure is about 0.1 MPa.

The configuration of the static mixers was maintained identical to that of example 1, so as to have an average residence time of about 7 minutes, but a total average residence time, considering the suction phase and pumping, of about 12 minutes so that the selective cross-linking already takes place in the compression phase.

The AES polymer thus modified, which is at the end of the static mixers, is subsequently cooled and granulated.

The properties of polymer C leaving the selective cross-linking section compared to those of polymer B1 removed from the reactor (r) as such, are summarized in table 3.

Table 4, on the other hand, compares the mechanical and rheological properties of polymers C and B1 after successive extrusions.

The tests were carried out with the injection moulding technique.

TABLE 3

| Characteristics | ASTM | Meas. units | Pol. C | Pol. B1 |
|---|---|---|---|---|
| Tensile Modulus (E) | D638[1] | MPa | 1813 | 1690 |
| $\sigma_U$ | | MPa | 38.1 | 35.8 |
| $\epsilon_U$ | | % | 3.4 | 3.3 |
| $\sigma_B$ | | MPa | 31.8 | 29.8 |
| $\epsilon_B$ | | % | 113 | 75 |
| IZOD c.i | D256[2] | J/m | 1150 ± 30 | 1180 ± 20 |
| MFI (220° C./98, 1N) | D1238 | g/10' | 9.4 | 9.8 |

[1]test sample M3
[2]test sample ½" × ⅛" – 7.5 J club

TABLE 4

| Character. | ASTM | Meas. units | 1st extr.[3] Pol. C Pol. B1 | 2nd extr.[3] Pol. C Pol. B1 |
|---|---|---|---|---|
| IZOD c.i | D256[2] | J/m | 1132 ± 70<br>710 ± 100 | 1020 ± 100<br>610 ± 60 |
| MFI (220° C./98, 1N) | D1238 | g/10' | 9.8<br>11.4 | 10.5<br>12.3 |

[2]test sample ½" × ⅛" – 7.5 J club
[3]Co-rotating twin-screw extruder Berstorff ZE 25 × 33 Dia.

The properties of polymer C with respect to polymer B1 have the same behaviour observed for polymers A and B.

EXAMPLE 3 (COMPARATIVE)

To verify the selective cross-linking properties of the preadded components (ex. 1 and 2) with respect to the single components (N,N'-m-phenylenedimaleimide and PTMQ), polymers $A_C$ and $A_B$ were prepared using the same procedure schematized in example 1, which correspond to AES at the end of the plant with 0.30% parts by weight of PTMQ ($A_C$) and AES at the end of the plant with 0.45 parts by weight of N,N'-m-phenylenedimaleimide ($A_B$).

The AES polymers thus modified, which are at the end of the static mixers, are subsequently cooled and granulated.

The properties of polymers $A_C$ and $A_B$ with respect to those of polymer A are shown in table 5.

TABLE 5

| Character. | ASTM | Meas. units | Pol. A | Pol. $A_C$ | Pol. $A_B$ |
|---|---|---|---|---|---|
| Tensile Modulus (E) | D638[1] | MPa | 1940 | 1870 | 1903 |
| $\sigma_U$ | | MPa | 39.4 | 38.4 | 38.7 |
| $\epsilon_U$ | | % | 3.3 | 3.3 | 3.3 |
| $\sigma_B$ | | MPa | 32.2 | 31.7 | 32.5 |
| $\epsilon_B$ | | % | 119 | 118 | 118 |
| IZOD c.i | D256[2] | J/m | 1220 ± 41 | 1170 ± 60 | 1170 ± 60 |
| MFI (220° C./98, 1N) | D1238 | g/10' | 9.5 | 11.6 | 9.5 |

[1]test sample M3
[2]test sample ½" × ⅛" – 7.5 J club

Finally, tables 6a and 6b compare the properties of the polymers treated with a single component with respect to polymer A after successive extrusions.

It can be seen that the resilience properties remain high only for product A.

TABLE 6a

| Character. | ASTM | Meas. units | 1st extr.[3] Pol. A Pol. $A_C$ | 2nd extr.[3] Pol. A Pol. $A_C$ |
|---|---|---|---|---|
| IZOD c.i | D256[2] | J/m | 1136 ± 80<br>956 ± 103 | 1000 ± 44<br>800 ± 80 |
| MFI (220° C./98, 1N) | D1238 | g/10' | 10.5<br>12.8 | 10.8<br>13.5 |

TABLE 6b

| Character. | ASTM | Meas. units | 1st extr.[3] Pol. A Pol. $A_B$ | 2nd extr.[3] Pol. A Pol. $A_B$ |
|---|---|---|---|---|
| IZOD c.i | D256[2] | J/m | 1136 ± 80<br>1010 ± 62 | 1000 ± 44<br>854 ± 30 |
| MFI (220° C./98, 1N) | D1238 | g/10' | 10.5<br>10.4 | 10.8<br>10.4 |

[2]test sample ½" × ⅛" – 7.5 J club
[3]Co-rotating twin-screw extruder Berstorff ZE 25 × 33 Dia.

EXAMPLE 4 (COMPARATIVE)

Acording to the plant scheme of FIG. 1, the AES polymer at the end of the plant and having a composition analogous to that of example 1, is removed from the reactor (r) and sent to a twin-screw extruder without passing it through the static mixers, so that the selective modification reaction takes place directly in the extruder.

The reagents used for the selective cross-linking, consisting of N,N'-m-phenylenedimaleimide and PTMQ, are introduced together with the AES polymer into the feeding zone of the extruder; for this purpose, a Berstorff ZE 25×33 Dia co-rotating twin-extruder is used with an average residence time of about 5 min., a flow-rate of about 1.4 Kg/h and a pressure at the head of 2 MPa.

Polymer E thus modified which is at the end of the extruder, is subsequently cooled and granulated.

The properties of polymer E compared with those of polymer A are summarized in table 7, whereas the properties of polymer E compared with those of polymer B as such, are summarized in table 8.

TABLE 7

| Characteristics | ASTM | Meas. units | Pol. A | Pol. E |
|---|---|---|---|---|
| Tensile | D638[1] | | | |
| Modulus (E) | | MPa | 1940 | 1830 |
| $\sigma_U$ | | MPa | 39.4 | 34.8 |
| $\epsilon_U$ | | % | 3.3 | 3.5 |
| $\sigma_B$ | | MPa | 32.2 | 29.5 |
| $\epsilon_B$ | | % | 119 | 95 |
| IZOD c.i | D256[2] | J/m | 1220 ± 41 | 1100 ± 60 |
| MFI (220° C./98, 1N) | D1238 | g/10' | 9.5 | 11.5 |

[1]test sample M3
[2]test sample ½" × ⅛" – 7.5 J club

TABLE 8

| Characteristics | ASTM | Meas. units | Pol. A | Pol. E |
|---|---|---|---|---|
| Tensile | D638[1] | | | |
| Modulus (E) | | MPa | 1770 | 1830 |
| $\sigma_U$ | | MPa | 34.8 | 34.8 |
| $\epsilon_U$ | | % | 3.5 | 3.5 |
| $\sigma_B$ | | MPa | 29.5 | 29.5 |
| $\epsilon_B$ | | % | 76 | 95 |
| IZOD c.i | D256[2] | J/m | 1170 ± 60 | 1100 ± 53 |
| MFI (220° C./98, 1N) | D1238 | g/10' | 9.9 | 11.6 |

[1]test sample M3
[2]test sample ½" × ⅛" – 7.5 J club

The tables show that polymer E has lower properties than polymer A, but comparable however to those of polymer B.

We claim:

1. A continuous process for selective cross-linking comprising:

adding to a dispersed phase of polymers comprising styrene-acrylonitrile/ethylene-propylene-diene monomer (EPDM) rubber (AES), which leaves the end of a synthesis plant still in the molten state, a cross-linking substance and a coreagent to form a compound composition:

mixing said compound composition in mixing equipment to obtain a selectively cross-linked composition wherein said cross-linking substance is a polyfunctional monomer containing at least two ethylenic unsaturations and said coreagent is a dihydro-aromatic compound.

2. The process, according to claim 1, wherein the cross-linking substance is a polyfunctional monomer containing at least two unsaturations.

3. The process, according to claim 1, wherein the cross-linking substance is selected from the group consisting of a diester of methacrylic acid, a bismaleimide compound and a diallyl compound.

4. The process, according to claim 1, wherein the cross-linking substance is selected from the group consisting of an ethylene-glycol dimethacrylate, diethylene-glycol dimethacrylate, propylene-glycol dimethacrylate, hydroquinone dimethacrylate, methyl-hydroquinone dimethacrylate, N,N'-m-phenylenebismaleimide, 4,4'-bismaleimidodiphenyl methane, diallylphthalate and diallyl terephthalate.

5. The process, according to claim 1, wherein the cross-linking substance is N,N'-m-phenylenebismaleimide or hydroquinone dimethacrylate.

6. The process, according to claim 1, wherein the coreagent is a dihydro-aromatic compound.

7. The process, according to claim 1, wherein the coreagent is selected from the group consisting of 1,2-dihydronaphthalene, 9,10-dihydrophenanthrene, 6-decyl-2,2,4-trimethyl-1,2-dihydroquinoline, 6-ethoxy-2,2,4-trimethyl-1,2-dihydroquinoline, 2,2,4-trimethyl-1,2-dihydroquinoline, poly(6-ethoxy-2,2,4-trimethyl-1,2-dihydroquinoline) (ETMQ) and poly(2,2,4-trimethyl-1,2-dihydroquinoline) (PTMQ).

8. The process, according to claim 7, wherein the coreagent is poly(2,2,4-trimethyl-1,2-dihydroquinoline) (PTMQ).

9. The process, according to claim 1, wherein the mixing equipment is a static mixer.

10. The process, according to claim 1, wherein at least two static mixers are used arranged in series.

* * * * *